United States Patent
DeLuca et al.

(10) Patent No.: US 10,552,880 B2
(45) Date of Patent: Feb. 4, 2020

(54) SYSTEM, METHOD, AND RECORDING MEDIUM FOR COGNITIVE AND CONTEXTUAL QUEUE MANAGEMENT

(71) Applicant: International Business Machines Corporation, Armonk, NY (US)

(72) Inventors: Lisa Seacat DeLuca, Baltimore, MD (US); Jeremy Adam Greenberger, Raleigh, NC (US); James Robert Kozloski, New Fairfield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 489 days.

(21) Appl. No.: 15/160,611

(22) Filed: May 20, 2016

(65) Prior Publication Data

US 2017/0337590 A1    Nov. 23, 2017

(51) Int. Cl.
*G06Q 30/02* (2012.01)
*H04W 4/021* (2018.01)
*G06F 16/29* (2019.01)
*G06F 16/2457* (2019.01)

(52) U.S. Cl.
CPC ... *G06Q 30/0281* (2013.01); *G06F 16/24575* (2019.01); *G06F 16/29* (2019.01); *H04W 4/021* (2013.01)

(58) Field of Classification Search
CPC .......... G06N 20/00; G06N 7/005; G06N 3/02; G06N 5/022; G06N 5/04; G06Q 50/01; G06Q 10/06; G06Q 10/101; G06Q 10/103; G06Q 50/30; G06Q 30/0281;

(Continued)

(56) References Cited

U.S. PATENT DOCUMENTS

2003/0010822 A1*  1/2003  Davies ................ G06Q 10/047
                                                    235/385
2011/0185293 A1*  7/2011  Barnett ............... H04M 3/5232
                                                    715/760

(Continued)

OTHER PUBLICATIONS

Parker, Matt, "Win A Million Dollars with Maths, No. 3: The Navier-Stokes Equations," The Guardian [online], Dec. 15, 2010, available at: <https://www.theguardian.com/science/blog/2010/dec/14/million-dollars-maths-navier-stokes> (Year: 2010).*

(Continued)

*Primary Examiner* — Minnah L Seoh
*Assistant Examiner* — Richard W. Crandall
(74) *Attorney, Agent, or Firm* — Anthony Curro, Esq.; McGinn IP Law Group, PLLC

(57) ABSTRACT

A queue management method, system, and non-transitory computer readable medium, include a queue management system including a device recognition circuit configured to recognize when a user device enters a queuing zone, and place a user having the user device into a queue with a plurality of users, a user data retrieving circuit configured to retrieve at least one of cognitive data and contextual data of the user, and a queue managing circuit configured to analyze the contextual data and the cognitive data to create a queue property for each user of the plurality of users in the queue based on the analyzed contextual data and the analyzed cognitive data.

12 Claims, 5 Drawing Sheets

(58) Field of Classification Search
CPC .... G06F 2209/548; G05B 2219/31378; G05B 2219/31272
USPC ........................................................ 705/346
See application file for complete search history.

(56) References Cited

U.S. PATENT DOCUMENTS

| | | | | |
|---|---|---|---|---|
| 2014/0163934 A1* | 6/2014 | Zhang | .................... | G06Q 10/06 703/2 |
| 2015/0186957 A1* | 7/2015 | Barr | .................... | G06Q 30/0281 705/346 |
| 2015/0287108 A1* | 10/2015 | Monk | .................... | G06Q 10/20 705/5 |
| 2016/0027073 A1* | 1/2016 | Eramian | ............... | H04W 4/029 705/346 |

OTHER PUBLICATIONS

Hughes, Roger L., "The Flow of Human Crowds," Annu. Rev. Fluid. Mech., 2003 35:169082. Available at: <http://www.cs.uu.nl/docs/vakken/mpap/papers/15.pdf> (Year: 2003).*

Anonymously; "System to commodify position in a queue"; http://ip.com/IPCOM/000240086; Dec. 29, 2014.

Anonymously; "System to Help Customers Plan and Minimize Time Waiting in Queues"; http://ip.com/IPCOM/000218131; May 23, 2012.

* cited by examiner

SYSTEM, METHOD, AND RECORDING MEDIUM FOR COGNITIVE AND CONTEXTUAL QUEUE MANAGEMENT

BACKGROUND

The present invention relates generally to a queue management system, and more particularly, but not by way of limitation, to a system for optimizing queues based on cognitive, contextual data, and user properties modeled as a fluid.

Conventionally, queue management systems have included a paper ticket in which a person takes a number and their position in a queue is based on their number being called on a "first-come first-called" protocol (i.e., "first-in-time"). Other conventional techniques have considered an application that requires a person to log into a mobile application to see an employee (i.e., doctor, etc.) and request the next number in a queue. Even other conventional techniques have considered a centralized kiosk that each individual approaches, inputs information, and receives their number in the queue.

However, the conventional techniques merely create a queue (i.e., an order) of individuals and do not consider re-ordering the queue based on any factors other than a "first-in-time" technique that follow the premise of the first user to enter the queue is earlier in the queue than a second user to enter the queue.

That is, there is a technical problem in the conventional techniques that the conventional techniques do not consider an efficient queue management technique using contextual, cognitive, user properties, and/or other resources to more efficiently and dynamically order the queue rather than the "first-in-time" technique.

SUMMARY

The inventors have considered the newly identified technical problem and realized that there is a significant need for more efficient queue management beyond the conventional "first-in-time" techniques.

Thus, the inventions have realized a technical solution to the newly identified technical problem by re-ordering the queue based on the cognitive factors, contextual factors, and/or imbuing the individuals in the queue with properties based on, for example, Dissipative Particle Dynamics (DPD), to create a better flow of people in a queue. Therefore, venue operators can achieve more detailed analytics for people waiting in a queue and the venues can be more efficient by managing customers in queue to maximize queue times to increase revenue.

In an exemplary embodiment, the present invention can provide a queue management system including a device recognition circuit configured to recognize when a user device enters a queuing zone, and place a user having the user device into a queue with a plurality of users, a user data retrieving circuit configured to retrieve at least one of cognitive data and contextual data of the user, and a queue managing circuit configured to analyze the contextual data and the cognitive data to create a queue property for each user of the plurality of users in the queue based on the analyzed contextual data and the analyzed cognitive data.

Further, in another exemplary embodiment, the present invention can provide a queue management system, comprising a device recognition circuit configured to recognize when a user device enters a queuing zone, and to place a user having the user device into a queue with a plurality of users, a user data retrieving circuit configured to retrieve a user property of the user, and a queue managing circuit configured to model the plurality of users as a non-Newtonian fluid, analyze the user properties to assign each user an anisometric polarity parameter, and to solve an objective function for a queue property to cause the plurality of users to collectively act as the non-Newtonian fluid in the queue.

Even further, in another exemplary embodiment, the present invention can provide a queue management method, including recognizing when a user device enters a queuing zone and placing a user having the user device into a queue with a plurality of users, retrieving at least one of cognitive data and contextual data of the user, and managing the queue by analyzing the contextual data and the cognitive data to create a queue property for each user of the plurality of users in the queue based on the analyzed contextual data and the analyzed cognitive data.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

Figure 1:
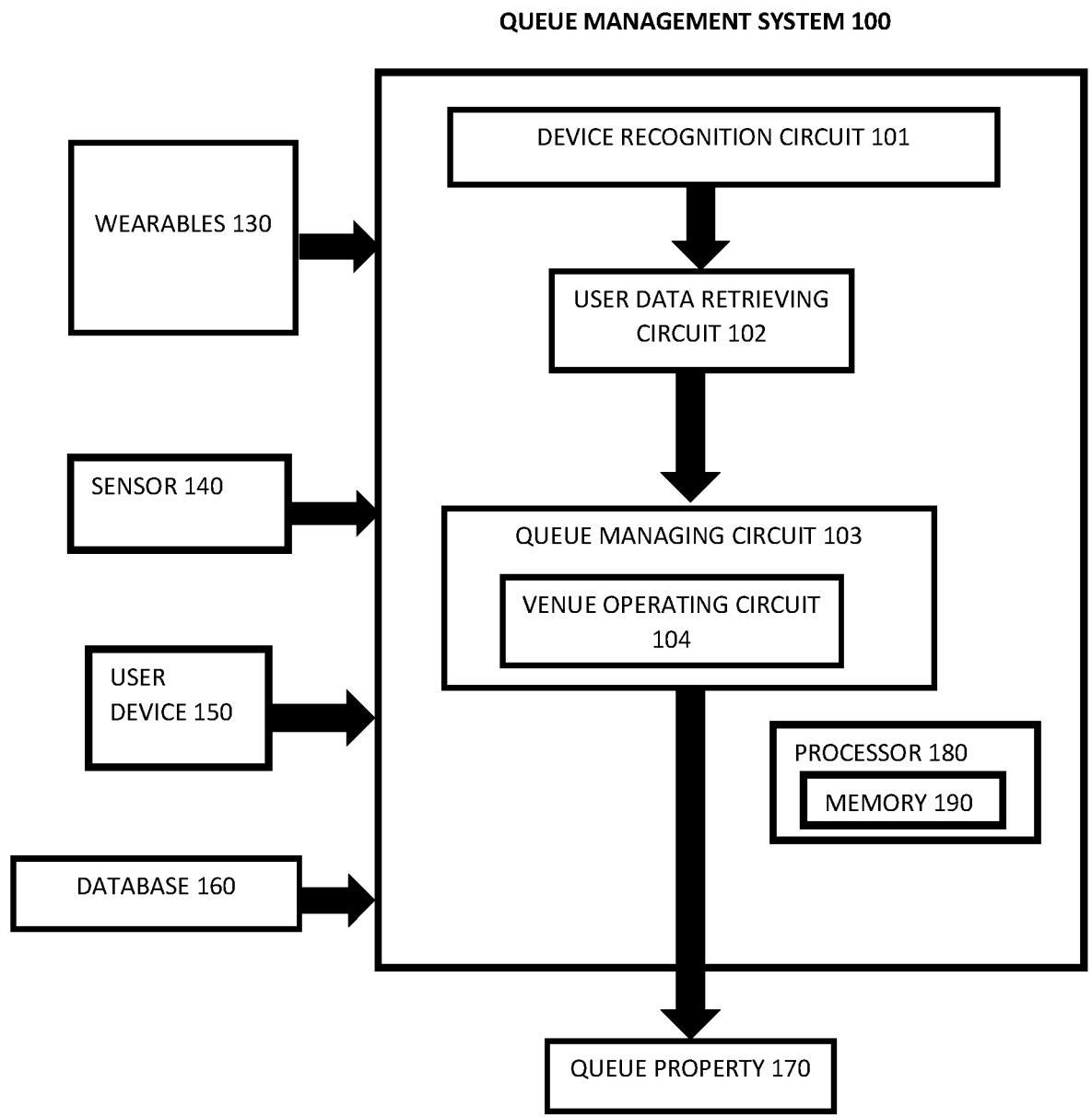
FIG. 1 exemplarily shows a block diagram illustrating a configuration of a queue management system 100.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the queue management system 100 includes a device recognition circuit 101, a user data retrieving circuit 102, a queue managing circuit 103, and a venue operating circuit 104. The queue management system 100 includes a processor 180 and a memory 190, with the memory 190 storing instructions to cause the processor 180 to execute each circuit of queue management system 100. The processor and memory may be physical hardware components, or a combination of hardware and software components.

Although the queue management system 100 includes various circuits, it should be noted that a queue management system can include modules in which the memory 190 stores instructions to cause the processor 180 to execute each module of queue management system 100.

Also, each circuit can be a stand-alone device, unit, module, etc. that can be interconnected to cooperatively produce a transformation to a result.

With the use of these various circuits, the queue management system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action— that characterize systems (i.e., humans) that all agree are cognitive.

Cognitive states are defined as functions of measures of a user's total behavior collected over some period of time from at least one personal information collector (including musculoskeletal gestures, speech gestures, eye movements, internal physiological changes, measured by imaging circuits, microphones, physiological and kinematic sensors in a high dimensional measurement space) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a cognitive state. The present application also describes the analysis, categorization, and identification of these cognitive states by means of further feature analysis of subgraphs, including dimensionality reduction of the subgraphs, for example by means of graphical analysis, which extracts topological features and categorizes the resultant subgraph and its associated feature nodes and edges within a subgraph feature space.

Figure 3:
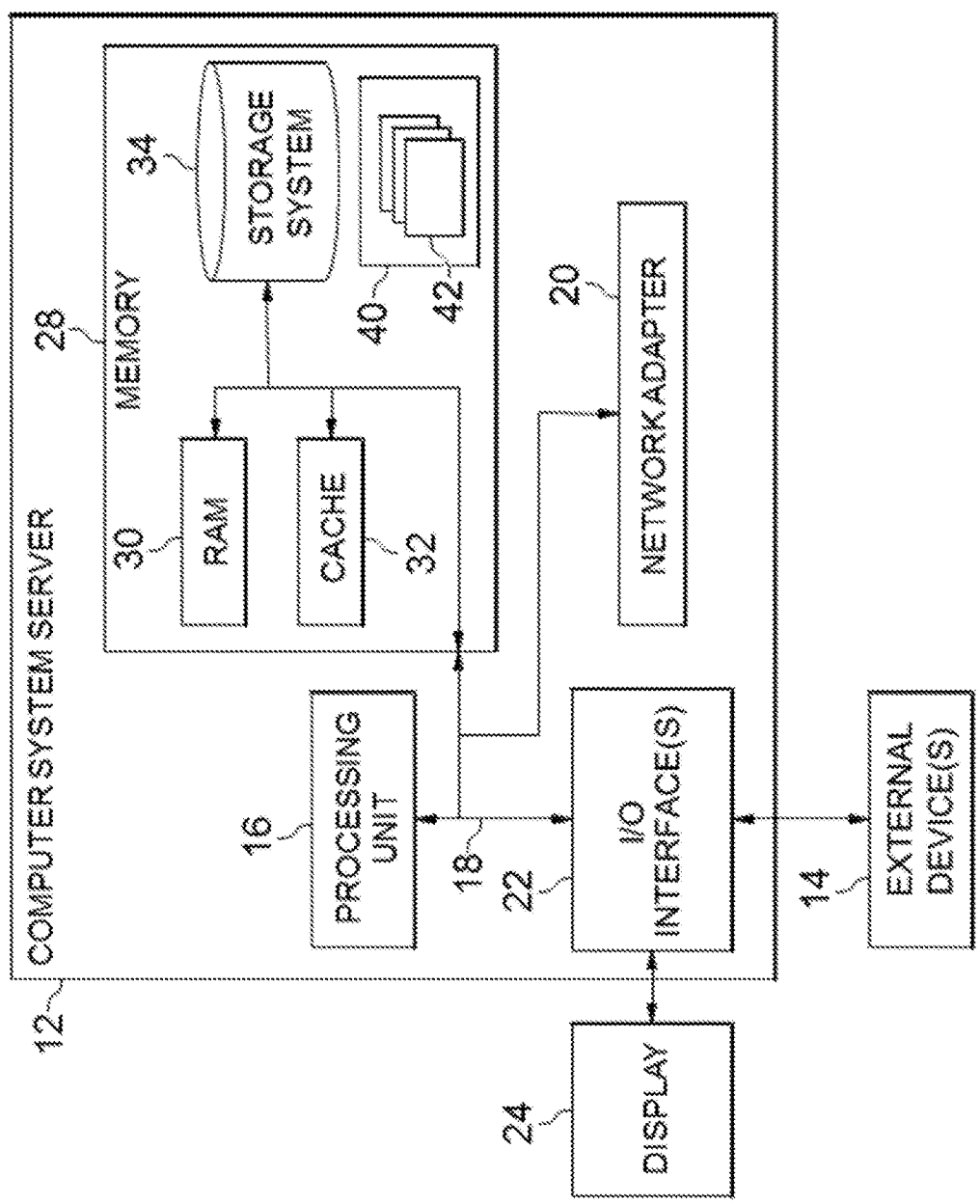
FIG. 3 depicts a cloud computing node 10 according to an embodiment of the present invention.
Figure 4:
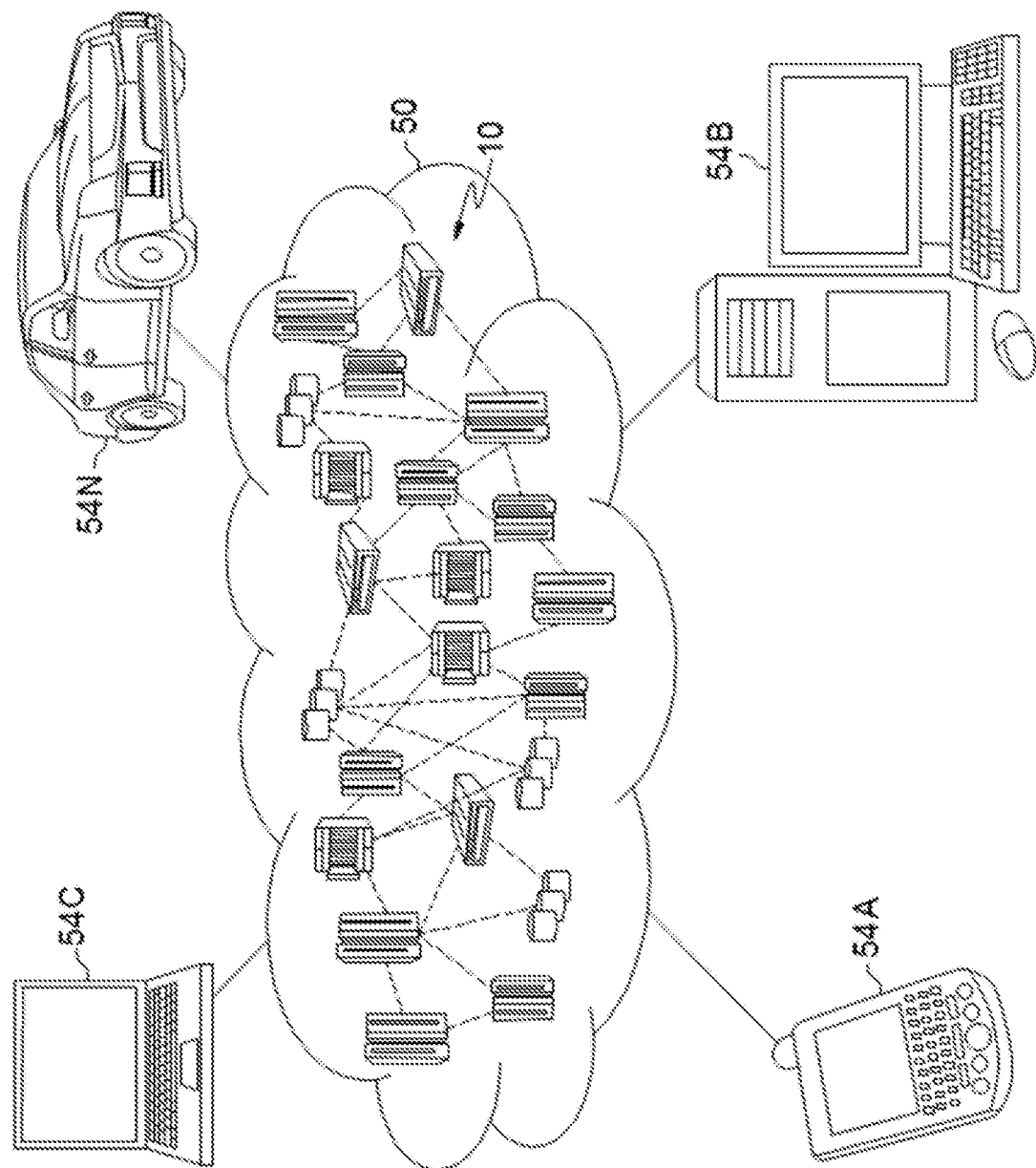
FIG. 4 depicts a cloud computing environment 50 according to another embodiment of the present invention.
Figure 5:
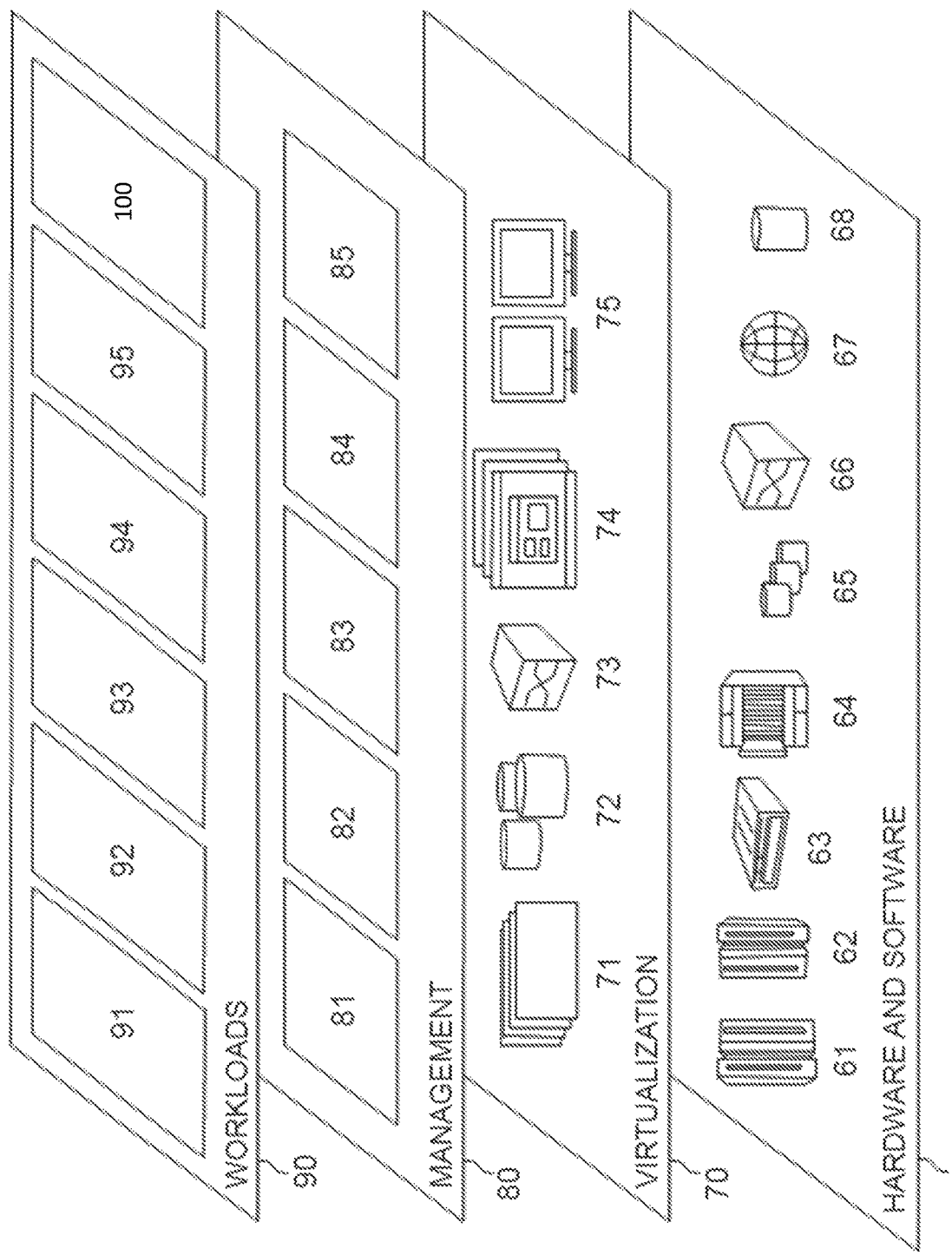
FIG. 5 depicts abstraction model layers according to an embodiment of the present invention.

Although as shown in FIGS. 3-5 and as described later, the computer system/server 12 is exemplarily shown in cloud computing node 10 as a general-purpose computing circuit which may execute in a layer the queue management system 100 (FIG. 5), it is noted that the present invention can be implemented outside of the cloud environment.

The queue management system 100 can be utilized in a venue that includes a pre-defined queuing zone. A queuing zone is an area of the venue or near the venue in which the user is able to be detected to be there within. For example, Bluetooth Low Energy (BLE) beacons and Wi-Fi sensors are provided in the venues. The BLE beacons or Wi-Fi sensors transmit a wireless Bluetooth or Wi-Fi signal to enabled devices, such as smart phones, that can notify an application on the device that it is within the proximity of a specified location (i.e., the queuing zone). A venue operator specifies a size of the queueing zones based on the needs of the venue.

The device recognition circuit 101 monitors the queuing zone and recognizes when a user device 150 has entered the zone. The device recognition circuit 101 places the recognized user into a queue. The user can be the only user in the queue (i.e., if the user is the first user in the queuing zone that day), or the user is placed into the queue with a plurality of other users already in the queue. Alternatively, the system 100 could utilize existing queueing techniques in order to label which users to place into the queue.

Based on the device recognition circuit 101 recognizing a user device 150 in the queuing zone, the user data retrieving circuit 102 retrieves data about the user to efficiently place the user in the current queue.

That is, the data retrieving circuit 102 retrieves cognitive data and contextual data of the user from the user device 150, sensor 140, wearables 130, and/or database 160 along with properties of the user to model the queue of users as a fluid (e.g., using fluid mechanic properties, etc.) that can be retrieved from the user device 150, the sensor 140, the wearables 130, and/or the database 160. In other words, the user is put in the queue by the device recognition circuit 101, but as described later, the queue managing circuit 103 will re-order or transform the plurality of users in the queue such that the queue is more efficient based on the cognitive data, contextual data, and/or properties of the users.

The contextual data can include, for example, user information (e.g., age, gender, height, weight, etc.), customer/user history (e.g., a loyalty ranking of the user, loyalty program member, frequency of purchases, frequency of using customer support, frequency of referrals to other customers, etc.), historical information such as if the user has been in the queuing zone before, weather data (for example, if it is cold outside, the data would indicate that a queue outside should be moved inside or the like), time of day, and social/news alerts to monitor complaints from a user about the queue or potential spikes in users wanting to join the queue. Therefore, if a user is creating bad reviews for a venue because of a queue time, the contextual data can be collected to indicate this and output the data to the queue managing circuit 103.

Other contextual data can include the user's schedule, income, cash or credit spender, etc. That is, data regarding a user's schedule can help place a user in queue if the user is not busy the whole day or only has a few minutes to get in and out of the queue. Or, if the queue is for an expensive item that is outside of a price range of a user who has entered the queuing zone, the contextual data can be collected that may help rank the user towards the back of the queue since they cannot purchase an item even if placed in queue.

Cognitive data collected about the user include, for example, mobile device activity showing if the user is wandering, if the user knows what they are doing, if the user needs help, if the user is pacing; biometrics indicating human characteristics of the user to show an emotion such as measuring the user's heart rate, blood pressure, body temperature, etc.; an analysis of the user's speech to predict an emotion of the user (e.g., is the user happy waiting or very upset waiting based on their speech); an analysis of the user's mobile device use, such as if the user is talking, texting, browsing, verifying the type of content to measure a user's boredom or if the user is content being in a queue, the cadence of the use of the phone to indicate the emotional state of the user, and other data that can be measured to indicate cognitive features of the user.

Properties of the user to model the queue of users as a non-Newtonian fluid (i.e. "user properties") can include, for example, the position of the users and assigning to each an anisometric polarity parameter based on analysis of the user's cognitive state, wearables signals, their most likely direction of movement, heading, focus of attention, body orientation, etc.

The user data retrieving circuit 102 sends the cognitive data, contextual data, and the user properties to the queue managing circuit 103.

In a first embodiment, the queue managing circuit 103 analyzes the contextual data and the cognitive data and orders the queue of users based on the analyzed data. That is, the queue managing circuit 103 weighs the contextual data and the cognitive data to determine what a user's position in queue should be in order to optimize the queue.

For example, if the queue managing circuit 103 analyses the cognitive data and contextual data of a user and determines that the user is causing a scene and disrupting the entire queue, the queue managing circuit 103 can put that particular user in front of the queue to remove the disruption.

The queue managing circuit 103 includes a venue operating circuit 104 in which the venue can modify the weights of the cognitive data and contextual data, remove a user from the queue, allow a user to leave the queueing zone and remain in the queue, etc.

For example, if the venue is focused on public persona, even if the contextual data of the above user shows that the user cannot purchase the product, and has nothing else to do that day, the venue can input via the venue operating circuit 104 that the cognitive data of a disruption or frustration is weighted ahead of all other factors. Therefore, even if a second user has contextual data showing that the user only has a brief time to wait in queue, the queue managing circuit 103 places the first user causing the disruption ahead of the second user with limited time based on the venue inputting the preferences via the venue operating circuit 104. As such, the venue can dynamically adjust or modify the queue and/or conditions of the queue.

Further, the venue operating circuit 104 can indicate to the queue managing circuit 103 to exclude a particular device (i.e., an employee device).

Also, the venue can set the needs of the queue using the venue operating circuit 104 to cause the queue managing circuit 103 to weigh the cognitive data and contextual data based on, for example, brand loyalty of customers who have been loyal in the past are rewarded with faster service.

Based on the analysis of the contextual data and the cognitive data, the queue managing circuit 103 outputs a queue property 170. The queue property 170 includes the order of the users in queue and dynamically changes as new users enter the queueing zone.

In a second embodiment, the queue managing circuit 103 analyzes the user properties to assign each user an anisometric polarity parameter. That is, the queue managing circuit 103 manages the crowd of users based on Dissipative Particle Dynamics (DPD) for creating a stochastic simulation simulating the dynamics and properties of the crowd as a complex fluid to determine how the crowd is moving in space.

DPD is an off-lattice mesoscopic simulation technique which involves a set of particles moving in continuous space and discrete time. Particles represent whole molecules or fluid regions, rather than single atoms, and atomistic details are not considered relevant to the processes addressed. The particles' internal degrees of freedom are integrated out and replaced by simplified pairwise dissipative and random forces, so as to conserve momentum locally and ensure correct hydrodynamic behavior.

The queue managing circuit 103 uses an objective function which solves for the properties of the modeled fluid in the stochastic simulation to become more like a non-Newtonian fluid (i.e., a pseudoplastic fluid, a sheer thinning fluid, etc.).

The queue managing circuit 103 then computes the changes in the properties of the particles of the stochastic simulation from the received user properties to the user properties acting as a pseudoplastic fluid.

Therefore, the queue managing circuit 103 solves for the change required to the properties of each user to cause the user properties to act like particles of the pseudoplastic fluid. As a result, the queue managing circuit 103 is able to use the change to signal to each user to change their properties in accordance with the change such that if a stress (i.e., a crowd controlling signal to control the queue such as a "board now" sign in an airport, a "store is open" sign at a store, etc.) is activated, the user, and collectively the crowd, will act in an optimal manner to dissipate the queue.

In other words, a signal to the plurality of users to cause a change acts as a stress to a non-Newtonian fluid and will deform the queue.

That is, by modeling a crowd of individuals as a suspension of particles in a pseudoplastic fluid, flow rates into and through a virtual queue (for example, an airport boarding gate) can be maximized using the current invention. Specifically, by monitoring the position of individuals (for example throughout an airport) and assigning to each an anisometric polarity parameter based on an analysis of the individual's cognitive state, wearables signals, the users most likely direction of movement, heading, focus of attention, body orientation, etc., the viscosity of a group of individuals may be estimated.

Then, based on the queue managing circuit 103 analysis of a change required to manipulate the anisometric polarity to have the crowd act as a pseudoplastic, alerts may be sent to individuals (i.e., the queue property 170 output by the system 100) to change their anisometric polarity, and thereby the viscosity of the virtual fluid they comprise.

For example, the second embodiment considers a situation where a virtual queue is formed such as a full terminal with multiple gates. The second embodiment can assume that at any given time, 10% of individuals are boarding through a single given gate. The full terminal is modeled as at a suspension fluid by the queue managing circuit 103, and the anisometric polarity of all individuals may be modified by alerts such as a flashing light in the environment, a loud speaker, a text message, etc. These alerts may be provided to different individuals at different times to allow the large funneling of individuals to and through the boarding gate to be continuous and efficient. Individuals, based on this model created by the queue managing circuit 103, do not pause and wait, because the solution to the objective function and required change in properties of the users as calculated by the queue managing circuit 103 allows each user of the crowd to move at the right time, in the correct orientation, and at the correct rate, to establish a low pseudoplastic viscosity and a high flow rate. In other words, the crowd forming the virtual queue dissipates most efficiently such that each user of the crowd arrives at the destination for which they are in the virtual queue, at an optimal time.

As noted above, the queue managing circuit 103 also considers the perturbation of others in the terminal who are not boarding (i.e., the 90% not boarding at the gate), but whose movements can add to the pseudoplastic properties of the crowd. The queue managing circuit 103 can model the changes required to the users' properties not part of the virtual queue to request those users move or model the users in the virtual queue to avoid the users not in the virtual queue.

The first and second embodiment disclosed herein can allow for improved queue management to provide a technical solution by re-ordering the queue based on the cognitive or contextual factors and/or imbuing the individuals in the queue with properties based on dissipative particle dynamics to create a better flow of people in a queue. Therefore, venue operators can get more detailed analytics for people waiting in a queue and businesses can be more efficient by managing customers in queue properly to maximize efficiency to increase revenue.

Figure 2:
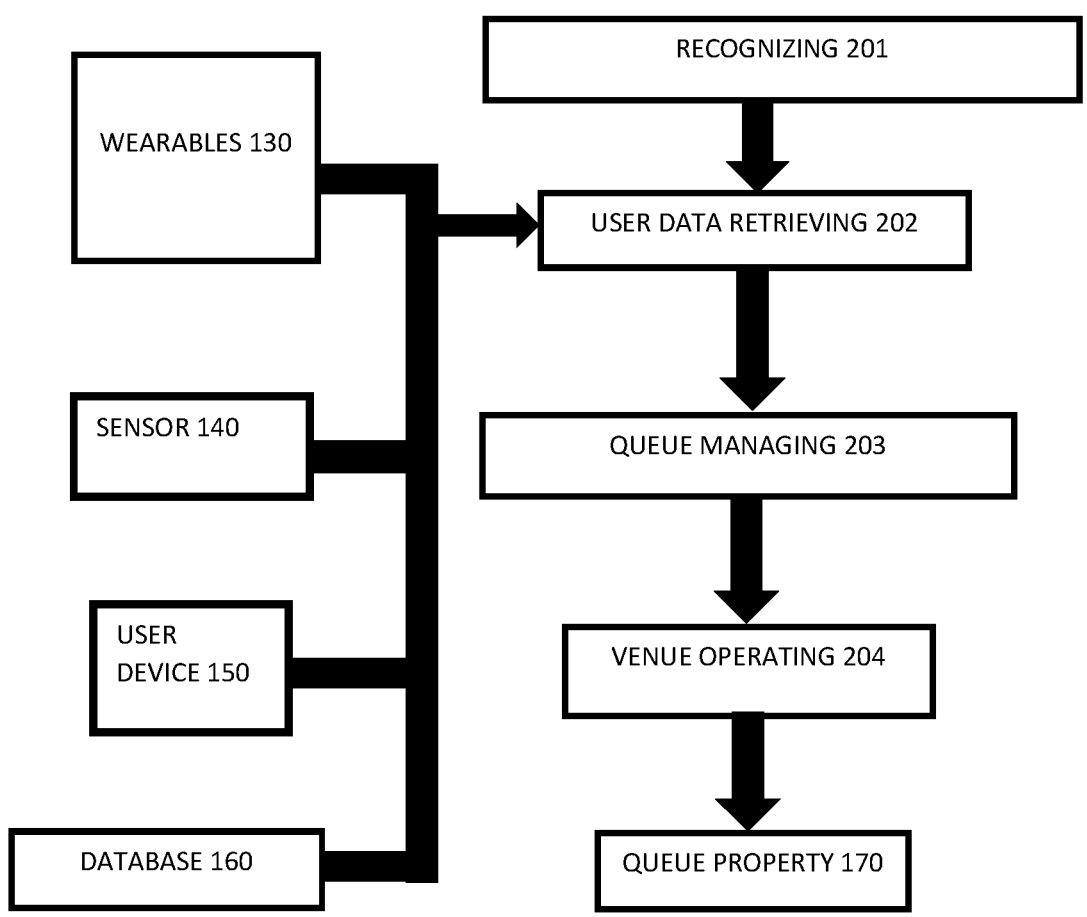
FIG. 2 exemplarily shows a high level flow chart for a queue management method 200.

FIG. 2 shows a high level flow chart for a method 200 of queue management.

Step 201 monitors a queuing zone and recognizes when a user device 150 has entered the queuing zone. Step 201 places the recognized user into a queue. Alternatively, the method 200 could utilize existing queueing techniques in order to label which users to place into the queue. In other words, the method can begin at Step 202 with a queue already formed and users identified in the queue.

Step 202 retrieves cognitive data and contextual data of the user from the user device 150, sensor 140, wearables 130, and/or database 160 along with properties of the user to model the queue of users as a fluid that can be retrieved from the user device 150, the sensor 140, and the wearables 130, and/or the database 160.

Step 203 analyzes the contextual data and the cognitive data and orders the queue of users based on the analyzed data. That is, step 203 weighs the contextual data and the cognitive data to determine what a user's position in queue should be in order to optimize the queue.

In a second embodiment, Step 203 can use an objective function to solve for the properties of the modeled fluid in a stochastic simulation to become more like pseudoplastic fluid. Thus, Step 203 calculates the change required to the properties of the users to cause the users in a virtual queue to act as a pseudoplastic fluid such that the virtual queue is optimized.

Step 204 allows a venue to modify the weights of the cognitive data and contextual data, remove a user from the queue, allow a user to leave the queueing zone and remain in the queue, etc.

The method 200 outputs a queue property 170 including the order of users of the queue or the change required to each user's properties to cause the virtual queue to act as a pseudoplastic fluid.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 3, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and data store software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the queue management system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A queue management system comprising:
    a device recognition circuit configured to recognize when a user device physically enters a queuing zone, and to place a user having the user device into a queue with a plurality of users;
    a user data retrieving circuit configured to retrieve both of cognitive data and contextual data of the user when the user device enters the queuing zone; and
    a queue managing circuit configured to analyze a combination of both of the contextual data and the cognitive data to create a queue property for each user of the plurality of users in the queue based on the analyzed contextual data and the analyzed cognitive data, wherein the managing further manages the queue by modeling the plurality of users as a non-Newtonian fluid by:
    modeling the plurality of users as a suspension of particles in the non-Newtonian fluid based on an analysis of the cognitive data of each user, wearables signals for each user, and a most likely direction of a movement of the user to estimate a viscosity of the plurality of users in the non-Newtonian fluid.

2. The system of claim 1, further comprising a venue operating circuit configured to allow a venue having the queueing zone to modify the queue property.

3. The system of claim 1, further comprising a venue operating circuit configured to allow a venue having the queueing zone to set a weight of the contextual data and a weight of the cognitive data such that the queue managing circuit creates the queue property based on the weight of the contextual data and the weight of the cognitive data.

4. The system of claim 2, wherein the venue operating circuit is further configured to allow the venue to exclude a particular user device from being recognized by the device recognition circuit.

5. The system of claim 1, wherein the queue managing circuit updates the queue property based on a parameter of the queuing zone, wherein the parameter of the queuing zone includes at least one of: a predicted time in queue; and a loyalty factor to a venue having the queuing zone.

6. The system of claim 1, wherein the contextual data includes at least one of:
    user information;
    a history of the user in the queueing zone;
    weather;
    time;

a social media alert;
and a news alert.

7. The system of claim 1, wherein the cognitive data includes at least one of:
biometric data of the user;
an activity amount of the user device by the user;
an analysis of speech of the user; and a usage amount of the user device by the user.

8. The system of claim 1, wherein the queue property includes a position in the queue.

9. The system of claim 1, wherein the queue property dynamically changes a position in the queue of each user of the plurality of users in the queueing zone.

10. The system of claim 1, wherein the user data retrieving circuit continuously retrieves current cognitive data and contextual data of the plurality of users in the queue even if the device recognition circuit does not recognize a new user entering the queueing zone.

11. The system of claim 1, wherein the queue property for each user is continuously updated by the queue managing circuit even if the device recognition circuit does not recognize a new user entering the queueing zone.

12. A queue management method, comprising:
recognizing when a user device physically enters a queuing zone and placing a user having the user device into a queue with a plurality of users;
retrieving both cognitive data and contextual data of the user when the user device enters the queuing zone; and
managing the queue by analyzing a combination of both of the contextual data and the cognitive data to create a queue property for each user of the plurality of users in the queue based on the analyzed contextual data and the analyzed cognitive data,
wherein the managing further manages the queue by modeling the plurality of users as a non-Newtonian fluid by:
modeling the plurality of users as a suspension of particles in the non-Newtonian fluid based on an analysis of the cognitive data of each user, wearables signals for each user, and a most likely direction of a movement of the user to estimate a viscosity of the plurality of users in the non-Newtonian fluid.

\* \* \* \* \*